(12) United States Patent
Emberling et al.

(10) Patent No.: US 7,089,509 B2
(45) Date of Patent: Aug. 8, 2006

(54) CONTROLLING THE PROPAGATION OF A CONTROL SIGNAL BY MEANS OF VARIABLE I/O DELAY COMPENSATION USING A PROGRAMMABLE DELAY CIRCUIT AND DETECTION SEQUENCE

(75) Inventors: Brian D. Emberling, San Mateo, CA (US); Anthony S. Ramirez, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 569 days.

(21) Appl. No.: 10/328,565

(22) Filed: Dec. 23, 2002

(65) Prior Publication Data

US 2004/0123173 A1  Jun. 24, 2004

(51) Int. Cl.
G06F 17/50 (2006.01)
G06F 12/00 (2006.01)

(52) U.S. Cl. .............................. 716/1; 716/6; 711/100

(58) Field of Classification Search .................... 716/1, 716/6; 365/193–194; 713/400–401, 500, 713/503; 711/100, 111
See application file for complete search history.

(56) References Cited

U.S. PATENT DOCUMENTS

| 6,889,334 B1 * | 5/2005 | Magro et al. ................ 713/500 |
| 2004/0107324 A1 * | 6/2004 | Nystuen ...................... 711/158 |
| 2004/0117742 A1 | 6/2004 | Emberling et al. |

* cited by examiner

Primary Examiner—Paul Dinh
(74) Attorney, Agent, or Firm—Meyertons Hood Kivlin Kowert & Goetzel, P.C.; Jeffrey C. Hood

(57) ABSTRACT

The propagation of a feedback signal, such as a DQS signal generated in response to a read request in a Double Data Rate (DDR) memory system, into a digital host system, such as an ASIC, is controlled by using a programmable delay circuit and detection sequence to compensate for variable I/O delay. The memory system includes a controller and an interface, both on the ASIC, and memory units coupled to the controller through the interface. The interface uses the read request signal, sent by the controller to initiate read operations, to generate a select signal. A programmable delay element inside the interface unit is programmed using a delay value generated by a delay manager unit inside the controller. The programmable delay element delays the select signal, and an enable signal is generated from the delayed select signal, using DQS. The propagation of DQS is controlled by the enable signal. For a number of preferred delay values that are determined through the detection sequence, the enable signal allows DQS to propagate into the ASIC only when DQS is a valid digital signal.

18 Claims, 6 Drawing Sheets

CONTROLLING THE PROPAGATION OF A CONTROL SIGNAL BY MEANS OF VARIABLE I/O DELAY COMPENSATION USING A PROGRAMMABLE DELAY CIRCUIT AND DETECTION SEQUENCE

BACKGROUND OF THE INVENTION

1. Field of the Invention

This invention relates generally to the field of digital interface design and, more particularly, to a system for controlling and timing the propagation of a control signal.

2. Description of the Related Art

The design of interfaces plays a significant role in the implementation of many digital systems. One example of a digital system is a Double Data Rate Synchronous Dynamic Random Access Memory (DDR SDRAM) system. FIG. 1 illustrates a common implementation of a DDR SDRAM system comprising a DDR SDRAM Controller coupled to a DDR SDRAM unit through an interface unit (Memory I/O). The Memory I/O is coupled to the DDR SDRAM unit through a set of pad circuits. In a DDR SDRAM, read-data is accompanied by a corresponding trigger signal, commonly referred to as a DQS signal. The DQS signal is commonly used by a host system, which may include an Application Specific Integrated Circuit (ASIC) coupled to the DDR SDRAM through an interface unit such as the Memory I/O, to sample and latch the read-data. The DQS signal does not always assume a distinctly defined low state or high state, considered valid states by the ASIC, during operations that are affected by the DQS signal, but frequently assumes a high impedance state, or stays at a mid-supply level, considered invalid states by the ASIC during the aforementioned operations. The ASIC uses the DQS signal to capture the read-data. The ASIC also typically needs to ascertain when the DQS signal is in a valid state.

In current low-speed designs the ASIC may use internal timers to determine when the DQS signal is valid. Variations in delay due to process, voltage and temperature make this method very difficult to use for high-speed designs. Current solutions for high-speed systems focus on the design of special pad cells that are used in coupling the Interface unit to the DDR SDRAM. These special pad cells contain digital and analog (mixed-signal) circuit elements used in preventing the DQS signal from propagating inside the ASIC when the DQS signal resides in an invalid state. Such pad cells may require extensive design times and often result in larger than desired cell areas. Most of the time they are also slower than standard pad cells, thus degrading the overall performance of the ASIC in such instances. Therefore, there exists a need for a system and method for controlling the propagation of a signal, such as the DQS signal, and like signals, which provide a simple and inexpensive solution while tracking all delay variations that the circuit experiences during operation, without requiring the design of special pad cells.

SUMMARY OF THE INVENTION

In one set of embodiments the invention comprises a system and method that provides an improved digital interface for controlling and timing the propagation of control signals. In one embodiment, the system comprises a memory controller, a memory unit, and a memory I/O unit. The memory controller may be coupled to the memory unit through the memory I/O unit. In one embodiment, the memory I/O unit is embedded on the same integrated circuit as the memory controller.

The memory I/O unit may be configured to receive a read signal from the memory controller. The memory I/O unit may also be configured to receive, from the memory unit, data, and a control signal corresponding to the read signal. The memory I/O unit may include a programmable delay element, which may be operable to receive a delay value. The memory controller may include a delay manager unit, which may be operable to generate the delay value, and transmit the delay value to the programmable delay element. In one embodiment, the memory I/O unit is configured to generate an enable signal based on the read signal. The memory I/O unit may conditionally propagate the control signal based on the enable signal. In one embodiment, the memory unit is configured to receive an encoded version of the read signal. The memory unit may also be configured to generate the control signal in response to the encoded version of the read signal.

The enable signal may be generated by the memory I/O unit by performing one or more of the following:

(a) generating a select signal by delaying the read signal by a predetermined latency that may be a multiple of one-half cycle of a system clock, (b) delaying the select signal by a latency determined by the delay value, using the programmable delay element, and (c) operating on the delayed select signal, using the control signal, to obtain the enable signal.

In one embodiment, a preferred delay value for programming the programmable delay element, is determined. The preferred delay value may result in the enable signal allowing the control signal to propagate only when the control signal is in a valid state. A detection sequence may be used to determine and select the preferred delay value.

Thus, various embodiments of the invention may provide a means for accurately controlling the propagation of a control signal into a host system, and insure that the control signal only reaches the host system when it is in a valid state as required by the host system.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
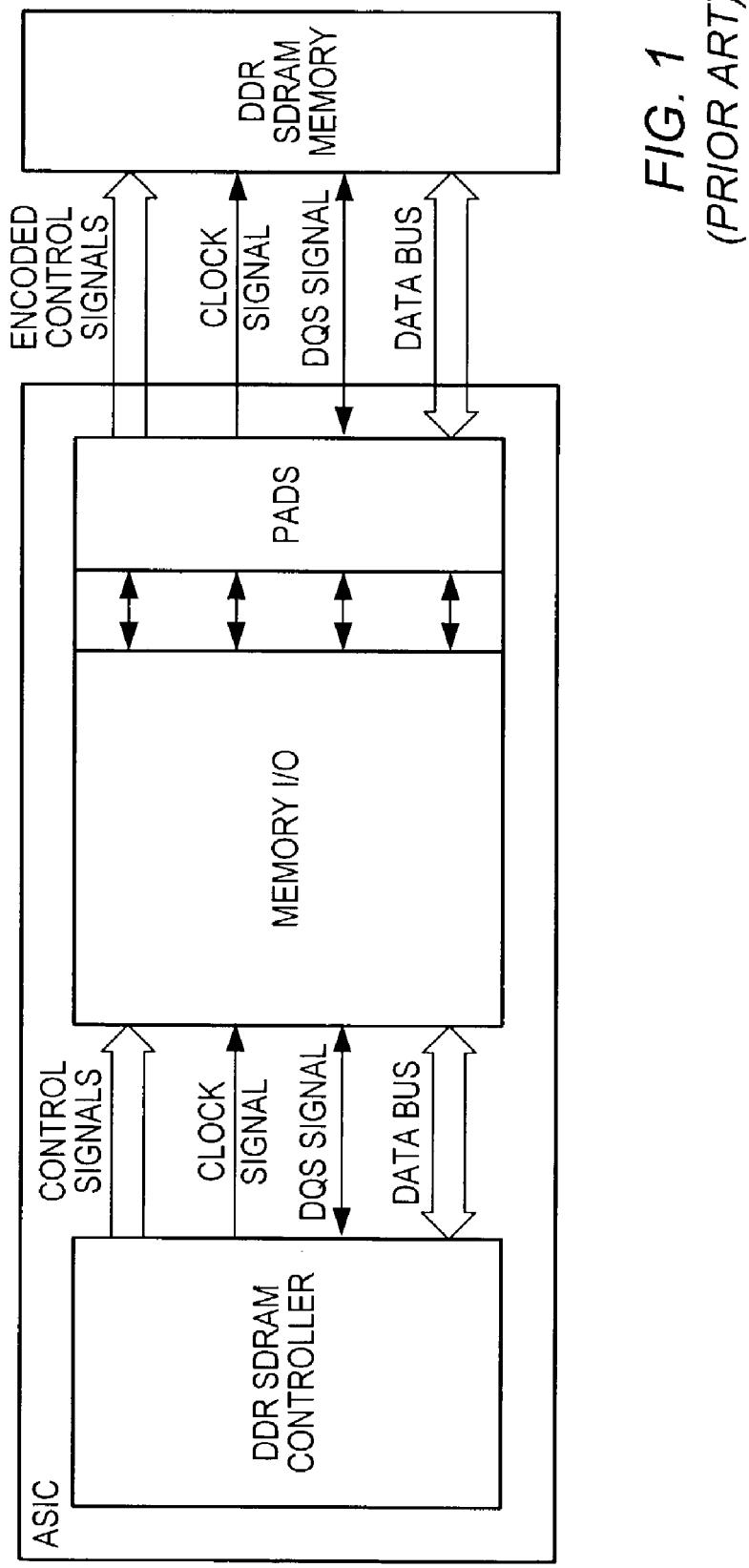
FIG. 1 illustrates a DDR SDRAM system configured in accordance with prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)". The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Incorporation by Reference

U.S. Application Ser. No. 10/317,740, titled "Controlling the Propagation of a Digital Signal by Means of Variable I/O Compensation Using Delay-Tracking" filed Dec. 12, 2002, and issued Oct. 18, 2005, as U.S. Pat. No. 6,957,399, and whose inventors are Brian D. Emberling and Anthony S. Ramirez, is hereby incorporated by reference as though fully and completely set forth herein.

As used herein, a "trigger" signal is defined as a signal that is used to initiate an event or a sequence of events in a digital system. A trigger signal is said to be in a "triggering state" at a time when it initiates a desired event, or sequence of events. A periodic trigger signal may commonly be referred to as a "clock". In a "synchronous" digital system, generally a clock, commonly referred to as a "system clock", may be used for initiating most events, or sequences of events. An example of a triggering state may be a rising edge of a clock in a synchronous digital system. When an event, or a sequence of events, is said to be initiated "in response to" receiving a stimulus signal, it may be implied that the event, or the sequence of events, is initiated as a result of a combination of a trigger signal, used in triggering the event or sequence of events, being in a triggering state at a time when the stimulus signal is asserted. In one set of embodiments, the sending of a pulse through an output port may indicate a point in time at which a leading edge of the pulse occurs at the output port, and the receiving of a pulse through an input port may indicate a point in time at which a leading edge of the pulse occurs at the input port.

A "range" of elements or values is defined as an ordered set of the elements or values, the range beginning with the smallest element or value and ending with the largest element or value. A "subset" of a group of elements may include any number of elements from the group, or all elements of the group. Two elements in a set or a range are said to be "adjacent" if the set or range does not contain any other single element that is larger than the first of the two elements and smaller than the second of the two elements.

Figure 2:
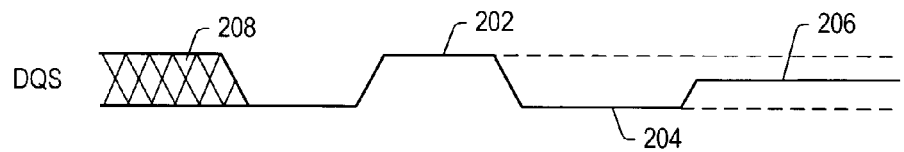
FIG. 2 illustrates a behavior of a DQS signal generated by a DDR SDRAM unit in accordance with prior art.

When discussing signals, a "mid-supply level" may refer to a state that represents a level nominally equidistant from a logic high level and logic low level, as illustrated in FIG. 2. A mid-supply level 206 may be set at a halfway distance between logic high 202 and logic low 204. When a signal is said to be residing in a "high impedance state" its value may be indeterminate, and thus unpredictable. A high impedance state 208 is also shown in FIG. 2. In some embodiments, "encoding" a single signal may mean the generation of a set of one or more signals for the purpose of representing the signal to be encoded, and where the set of signals may be propagated in lieu of the single signal to be encoded. A signal is said to be "qualified" when it meets the validity requirements as set forth by a host system. A host system may be, or may include an ASIC. A signal that may assume a mid-supply level 206 or a high impedance state 208 in a digital host system during operations that are affected by the signal is generally considered not to meet the validity requirements of the digital host system. If a trigger signal routed to a digital host system exhibits the behavior illustrated in FIG. 2 during operations affected by the trigger signal, the trigger signal may be considered as one not meeting the validity requirements set forth by the digital host system. A given timing relationship between signals may be deemed "substantially invariant" with respect to a nominal timing relationship between the signals, insofar as a behavior (pertaining to a system using the signals) implied or predicted by the given timing relationship does not deviate from a behavior implied or predicted by the nominal timing relationship.

A "data-valid window" for a signal represents a time period during which the signal may be considered a valid digital signal. A first signal is said to be "corresponding" to a second signal if the first signal was generated in response to the second signal. When data is said to be "registered" or "latched" "using" a signal, the signal acts as a trigger signal that controls the storing of the data into the register or latch. In other words, when a signal used for registering or latching data is in its triggering state, the data residing at respective input ports of the register or latch at the time is stored into the register or latch. A first signal is said to "propagated based on" a second signal, when the second signal controls the propagation of the first signal.

The term "bus" is used to refer to a plurality of signals or conductors that may be used to transfer one or more of various types of information, such as data, addresses, control, or status. "Burst length" is used to refer to a number that indicates how many consecutive data bus transfers may be performed in response to a single bus transfer request sent by a host system. For example, if a burst length is four and a memory read operation is performed, there may be four consecutive sets of data transferred on the data bus in response to a single read signal pulse sent by a host system. The size of a set of data for a single transfer over a data bus is typically commensurate with the size of the data bus. Common burst lengths for a DDR SDRAM may include the values of two, four or eight.

Figure 3:
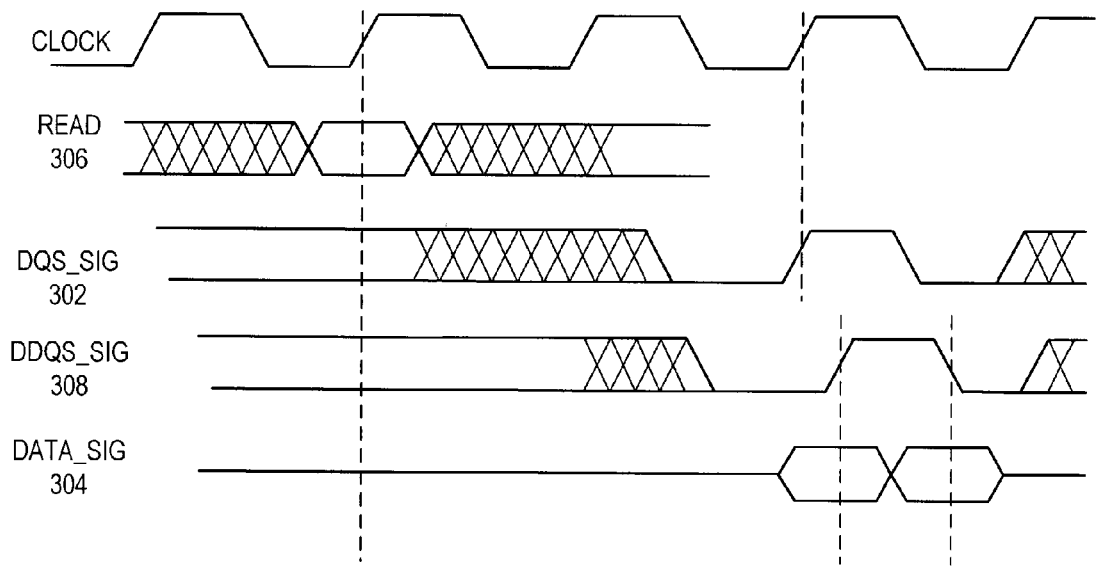
FIG. 3 illustrates a timing relationship between a read signal, a DQS signal, a delayed version of the DQS signal, and a data bus signal during a DDR SDRAM read operation in accordance with prior art.

According to prior art, a read operation for a DDR SDRAM may be performed as follows. A host system, which may be an ASIC that may include a DDR SDRAM controller and an interface unit, sends out a single Read request. The DDR SDRAM receives the Read request through a set of control signals. A predetermined number of clock cycles after having received the Read request, the DDR SDRAM sends a predetermined number of consecutive DQS signal pulses back to the host system. The predetermined number of clock cycles may be referred to as "CAS latency", where CAS stands for "Column Address Strobe". The number of consecutive DQS signal pulses may be commensurate with one half the value of a predetermined burst length for the read operation. The DDR SDRAM also sends a predetermined number of sets of data to the host system, where the number may be commensurate with the value of the predetermined burst length for the read operation. A timing relationship between a Read request (READ) 306, a DQS signal (DQS_SIG) 302, the DQS signal delayed by a quarter clock cycle (DDQS_SIG) 308 and data signal (DATA_SIG) 304 for the read operation is shown in FIG. 3, wherein for the purposes of illustration the burst length and the CAS latency have both been assigned a value of two.

Figure 4:
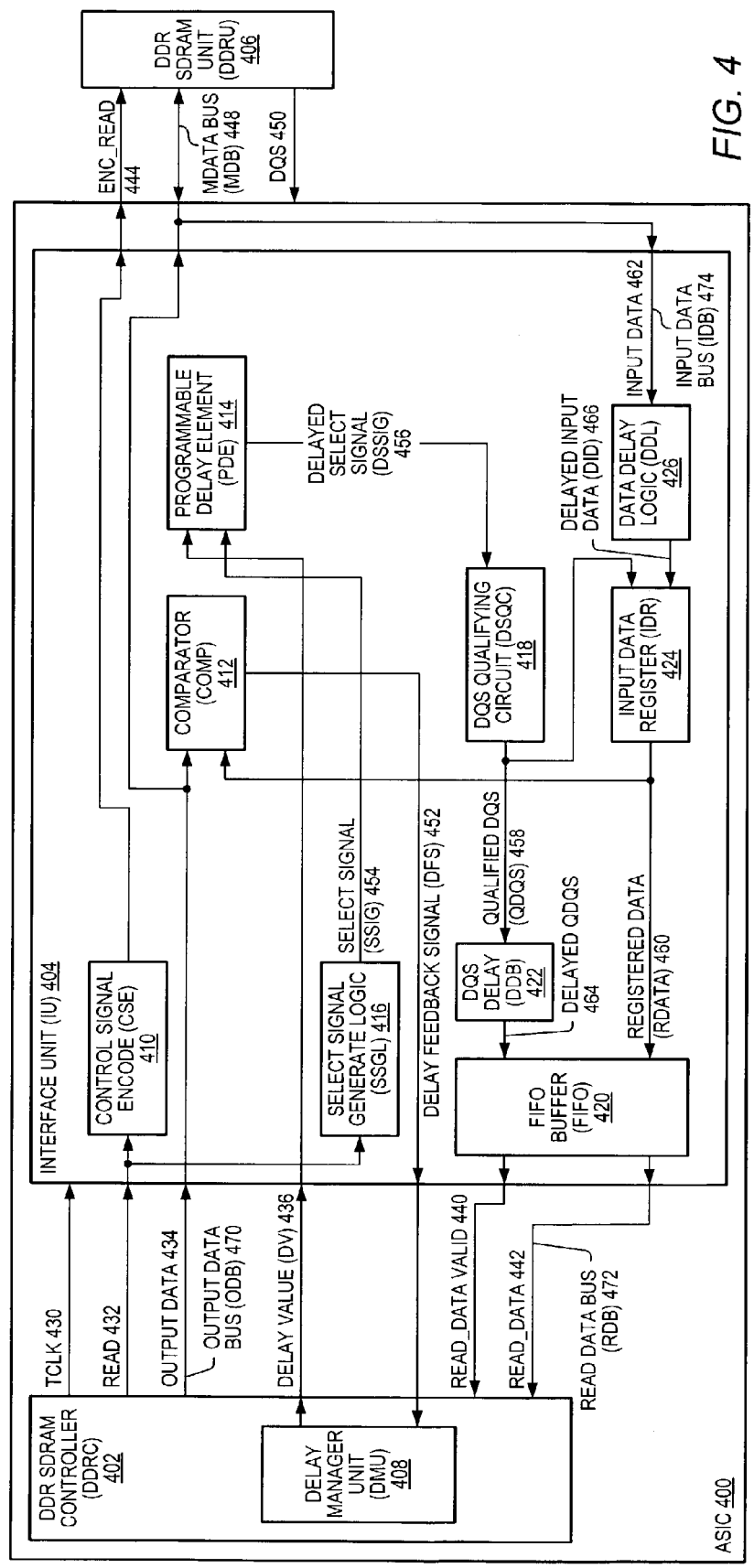
FIG. 4 illustrates an improved DDR SDRAM system with an improved interface unit, implemented in accordance with one set of embodiments of the present invention.

FIG. 4 illustrates part of a DDR SDRAM system implemented in accordance with one set of embodiments of the present invention. In this set of embodiments, the DDR SDRAM system comprises a DDR SDRAM Controller (DDRC) 402, an Interface unit (IU) 404, and a DDR SDRAM unit (DDRU) 406, where DDRC 402 is coupled to DDRU 406 through IU 404. A Read signal 432 generated by DDRC 402 is connected to IU 404, and a DQS signal 450 generated by DDRU 406 is also connected to IU 404. A bi-directional Memory Data Bus (MDB) 448 is connected between IU 402 and DDRU 406. A clock signal (TCLK) 430 provided by DDRC 402 is also connected to IU 404.

DDRC 402 may be a part of a Host ASIC (ASIC) 400. IU 404 may also be embedded on ASIC 400. In one embodiment, IU 404 contains a Select Signal Generate Logic block (SSGL) 416, a Control Signal Encode block (CSE) 410, a Programmable Delay Element block (PDE) 414, a First-In First-Out buffer (FIFO) 420, a DQS Signal Qualifying Circuit (DSQC) 418, a Data Delay Logic (DDL) 426 block, an Input Data Register (IDR) 424, a DQS Delay block (DDB) 422, and a Comparator block (COMP) 412. Read signal 432 may be connected to CSE 410 to generate an encoded version of Read signal 432 (ENC_READ) 444, where ENC_READ 444 may be directly routed to DDRU 406 from IU 404. Furthermore, Read signal 432 may be connected to and used by SSGL 416 to generate a Select signal (SSIG) 454.

In one embodiment, DDRC 402 contains a Delay Manager Unit (DMU) 408, and is coupled to IU 404 via an Output Data Bus (ODB) 470 that may carry Output Data 434 from DDRC 402 to IU 402. ODB 470 is coupled to COMP 412, and ODB 470 is also coupled to MDB 448. MDB 448 may take Output Data 434 from ODB 470, and carry Output Data 434 to DDRU 406. MDB 448 may also be coupled to an Input Data Bus (IDB) 474. IDB 474 may be connected to DDL 426. Input Data 462 may be carried from DDRU 406 to IU 404 through MDB 448, and may further be carried to DDL 426 through IDB 474. DDL 426 may operate on Input Data 462 resulting in DDL 426 generating a delayed version of Input Data 462 (DID) 466.

Figure 5:
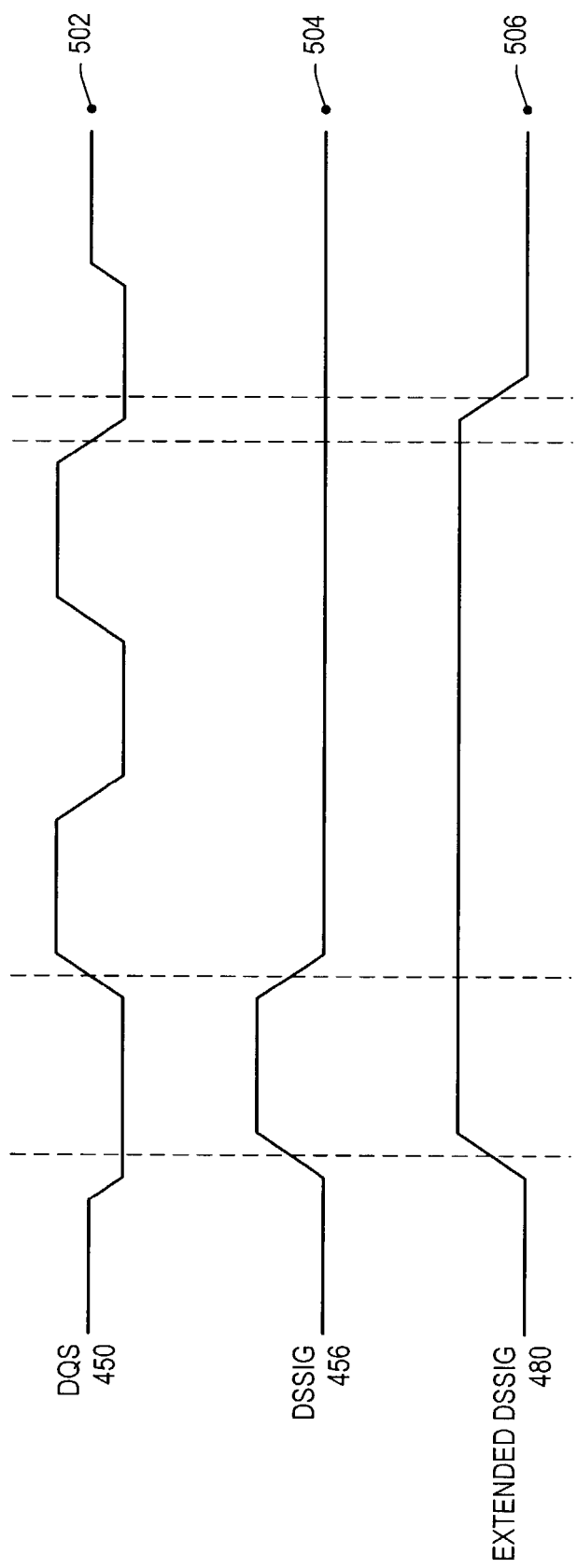
FIG. 5 illustrates a timing relationship between input and output signals of an embodiment of a DQS qualifying circuit.

In one embodiment, SSIG 454 is connected to PDE 414, and DMU 408 is coupled to PDE 414 via a Delay Value signal (DV) 436. Using SSIG 454 and DV 436, PDE 414 generates a Delayed Select Signal (DSSIG) 456, which may be connected to DSQC 418. DV 436 may determine the length of the delay by which PDE 414 delays SSIG 454 to generate DSSIG 456. The value of DV 436 may be determined such that a timing relationship between DSSIG 456 and DQS 450 is allowed to remain substantially unchanged, regardless of variations in delay due to process, voltage and temperature. The timing relationship is shown in FIG. 5, illustrated by a DSSIG 456 pulse and a first of one or more DQS 450 pulses. While two DQS 450 pulses are shown for illustrative purposes, the number of DQS 450 pulses is not limited to or defined to be two. As shown in FIG. 5, a DSSIG 456 pulse may precede a first of one or more DQS 330 pulses by one-half of a clock cycle, wherein the clock cycle is a cycle of TCLK 430. FIG. 5, also illustrates an extended DSSIG 456 (EDSSIG) 480, which may be generated internally by DSQC 418. EDSSIG 480 may remain asserted for a duration covering all the successive DQS 450 pulses. As also illustrated in FIG. 5, EDSSIG 480 may be asserted only when DQS 450 is in a valid state. As a result, QDQS 458 may not reside in an invalid state and may otherwise mirror DQS 450.

DSQC 418 may receive the signals DSSIG 456 and DQS 450 as inputs (note the input of DQS 450 to DSQC 418 is not explicitly shown in FIG. 4). DSQC 418 may use DSSIG 456 and DQS 450 to generate a qualified DQS signal (QDQS) 458. In one embodiment, DID 466 is routed to IDR 424, which registers DID 466 using QDQS 458, resulting in Registered Data (RDATA) 460. RDATA 460 may be routed to COMP 412, and a Delay Feedback Signal (DFS) 452 may be connected from COMP 412 to DMU 408. DFS 452 may indicate a pass/fail result of a comparison between a set of RDATA 460 and a set of Output Data 434, and may be used by DMU 408 in determining if a value assigned to DV 436 should be modified.

In one embodiment, QDQS 458 is connected to DDB 422, which results in DDB 422 outputting a Delayed QDQS (DQDQS) 464, and FIFO 420 uses DQDQS 464 to sample and latch RDATA 460. A timing relationship between DID 466 and QDQS 458 closely matches the nominal timing relationship illustrated in FIG. 3 between DATA_SIG 304 and DDQS_SIG 308, respectively. The nominal timing relationship may be required in order to successfully register DID 466. FIFO 420 may be coupled to DDRC 402 via a Read-Data Valid (RDV) 440 signal and a Read-Data Bus (RDB) 472 carrying Read-Data (READATA) 442 to DDRC 402. DDRC 402 may use RDV 440 to qualify READATA 442 for ASIC 400.

DSQC 418 may be implemented in a variety of different ways. In a preferred embodiment, DSQC 418 may be implemented as described in U.S. patent application Ser. No. 10/317,740 titled "Controlling the Propagation of a Digital Signal by Means of Variable I/O Compensation Using Delay-Tracking", which issued Oct. 18, 2005, as U.S. Pat. No. 6,957,399, and was incorporated by reference above.

Figure 6:
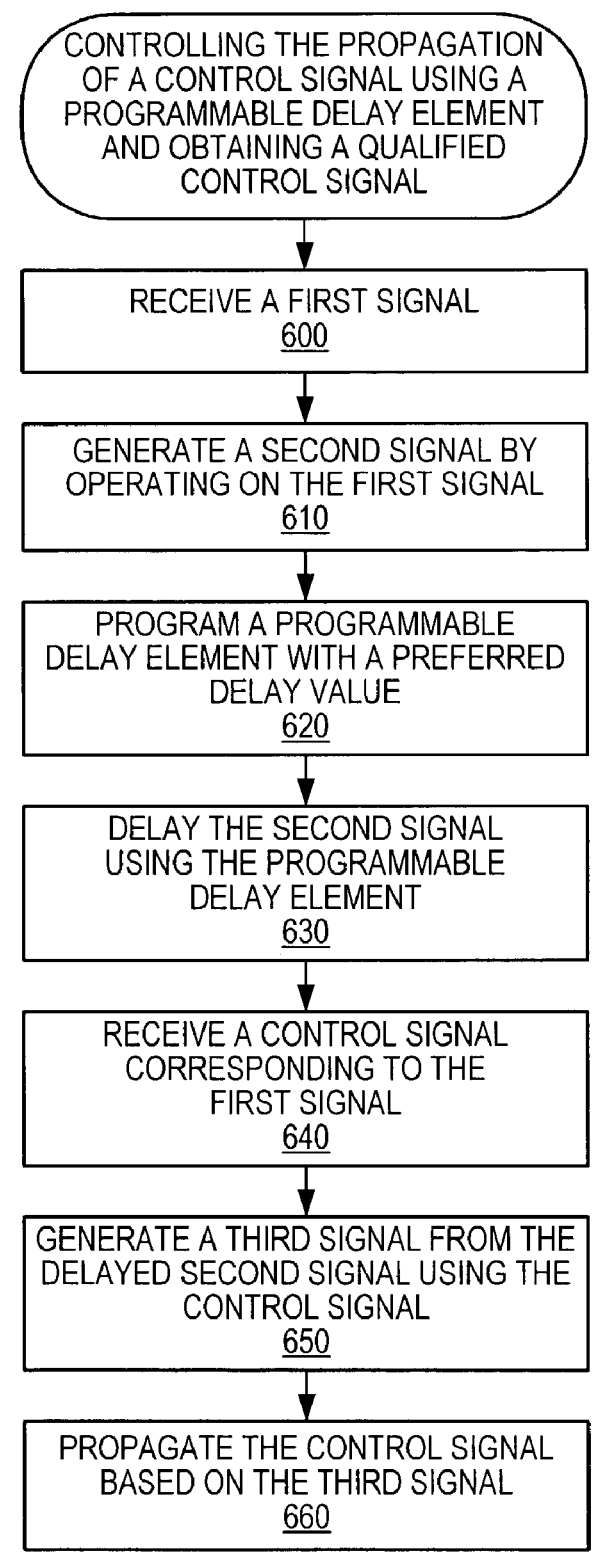
FIG. 6 illustrates part of a method for controlling the propagation of a control signal using a programmable delay element, and obtaining a qualified control signal, as pertaining to an interface unit.

A flowchart of one embodiment of a method for controlling the propagation of a control signal using a programmable delay element and obtaining a qualified control signal, as pertaining to an interface unit, is shown in FIG. 6. The method is discussed for a simple system comprising a memory controller coupled to a memory unit through the interface unit, with the memory controller containing a delay manager unit and the interface unit containing a programmable delay element.

The interface unit receives a first signal (600) and generates a second signal by operating on the first signal (610). In one embodiment the first signal is provided to the interface unit by the memory controller. For example, the first signal may be READ 432 and the second signal may be SSIG 454 as set forth in the embodiment illustrated in FIG. 4. The memory controller may be DDRC 402 as illustrated in FIG. 4. The operating in 610 may include delaying the first signal by a predetermined latency that may be a multiple of one-half cycle of a system clock. A programmable delay element, which may be PDE 414 in the embodiment of FIG. 4, is programmed with a preferred delay value (620), and is subsequently used for delaying the second signal, resulting in a delayed second signal (630). The interface unit receives a control signal corresponding to the first signal (640). A third signal is generated from the delayed second signal using the control signal (650). The control signal is then propagated based on the third signal (660), resulting in a conditionally propagated control signal. For a finite number of preferred delay values, the conditionally propagated control signal may be a qualified control signal.

In one embodiment, the control signal is generated by the memory unit, which sends a series of one or more pulses of the control signal in response to the memory unit having received either a pulse of the first signal or a pulse of an encoded version of the first signal, where the series of one or more pulses is received by the interface unit in 640. In this embodiment, a pulse of the delayed second signal precedes a first pulse of the series of one or more pulses of the control signal by one-half cycle of the system clock. Also, a leading edge of a pulse of the third signal corresponding to either the pulse of the first signal, or the pulse of the encoded version of the first signal, is aligned with a leading edge of the pulse of the delayed second signal. The length of the pulse of the third signal indicates a data-valid window of the qualified control signal. For instance, in the embodiment described in FIG. 4, the control signal may be DQS 450, and the memory unit may be the DDRU 406, while the interface unit may be IU 404.

Figure 7:
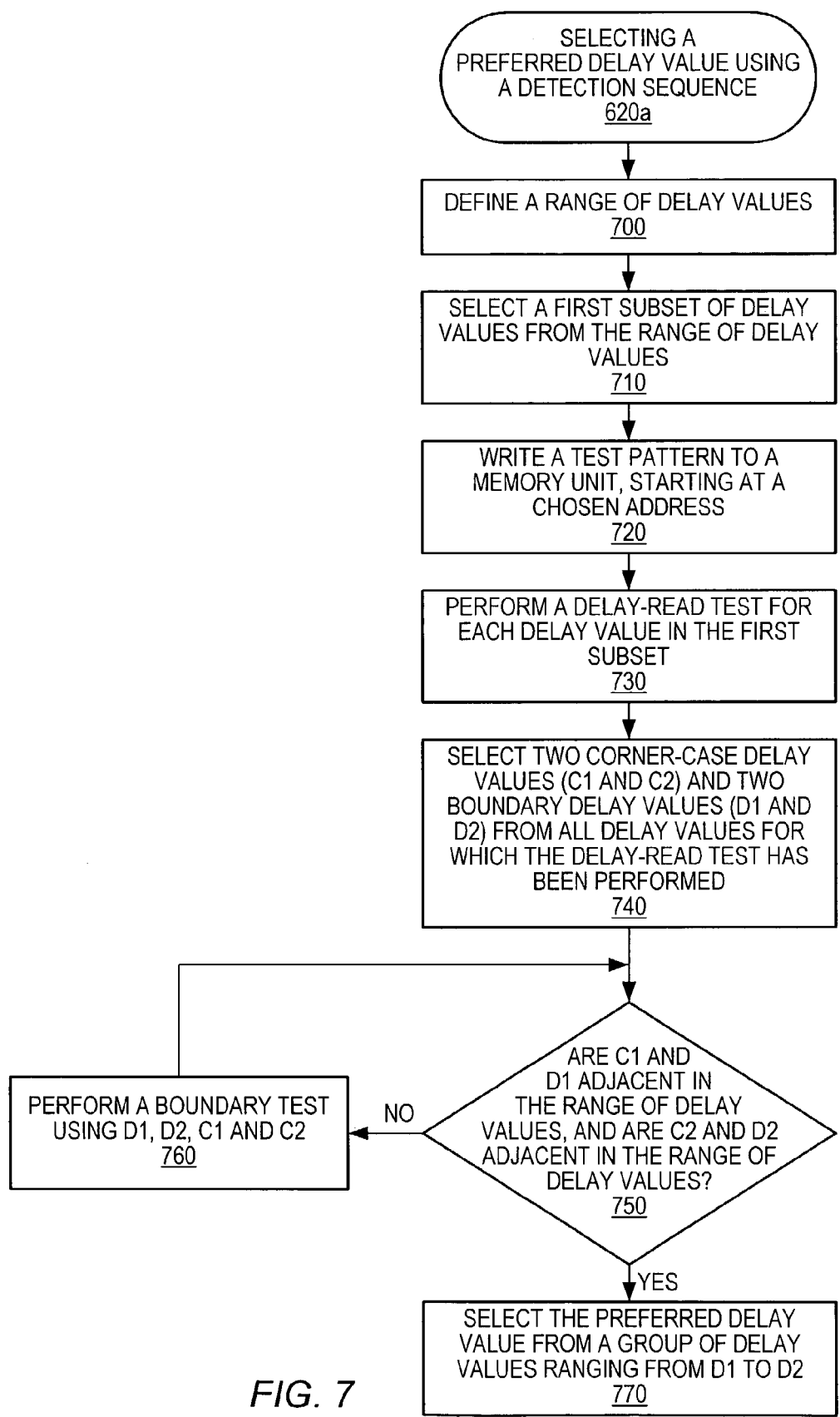
FIG. 7 illustrates part of a method for selecting a preferred delay value for programming a programmable delay element.

A delay value programmed in the programmable delay element affects a timing relationship between the third signal and the control signal. A preferred delay value may result in a pulse of the third signal correctly indicating a data-valid window of the control signal. A correctly indicated data-valid window may result in the third signal properly qualifying the control signal. FIG. 7 presents one way of selecting a preferred delay value using a detection sequence (620a). A range of delay values is defined (700), and a first subset of delay values is selected from the range of delay values (710). A test pattern is written to the memory unit, starting at a chosen address (720). A delay-read test is performed for each delay value in the first subset (730).

The delay-read test includes programming the delay value for which the test is being performed into the programmable delay element, reading a set of data starting at the chosen address from the memory unit, registering the set of data using the conditionally propagated control signal, and comparing the registered set of data with the test pattern. If the registered set of data matches the test pattern, the delay-read test has passed. If the registered set of data does not match the test pattern, the delay-read test has failed.

Two corner-case delay values (C1 and C2), and two boundary delay values (D1 and D2) are selected from all delay values for which the delay-read test has been performed (740). The two boundary delay values may be selected such that D1 is the smallest delay value for which the delay-read test passes, and D2 is the largest delay value for which the delay-read test passes. The two corner-case delay values may be selected such that C1 is the largest delay value smaller than D1 for which the delay-read test fails, and C2 is the smallest delay value larger than D2 for which the delay-read test fails. In other words, C1 is a member of a group of delay values that are all smaller than D1, and C1 is the largest delay value in the group for which the delay-read test fails. Similarly, C2 is a member of a group of delay values that are all larger than D2, and C2 is the smallest delay value in the group for which the delay-read test fails. If C1 and D1 are adjacent delay values in the range of delay values, and D2 and C2 are adjacent delay values in the range of delay values (750), then the preferred delay value is selected from a group of delay values ranging between D1 and D2, inclusive (770), otherwise a boundary test is performed using D1, D2, C1, and C2 (760). The boundary test is performed until the condition in 750 is met.

The boundary test includes selecting a second subset and a third subset from the range of delay values, and performing the delay-read test on each delay value in the second subset and the third subset, respectively. The second subset may be selected such that the smallest delay value in the second subset is larger than C1 and the largest delay value in the second subset is smaller than D1. Similarly, the third subset may be selected such that the smallest delay value in the third subset is larger than D2 and the largest delay value in the third subset is smaller than C2. When the condition in 750 is met, the preferred delay value may be determined by selecting a delay value around mid-point between D1 and D2.

Thus, various embodiments of the systems and methods described above may facilitate the control of the propagation of a control signal, such as a DQS signal in a DDR SDRAM system. A programmable delay element may be used to account for delay variations due to process, temperature or voltage, when generating an enable signal from a request signal, such as a read signal for DDR SDRAM read operations. This enable signal may be used to control the propagation of the control signal, and assure that the control signal is only propagated when it is in a valid state, during operations affected by the control signal.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A system for controlling the propagation of a control signal by means of variable input/output delay compensation, the system comprising:
   a memory controller;
   a memory; and
   an interface, wherein the memory controller is coupled to the memory through the interface, and wherein the interface includes a buffer, a qualifying circuit, and a programmable delay element which is operable to receive a delay value;
   wherein the interface is operable to:
      receive a read signal from the memory controller;
      output the read signal to the memory;
      receive a trigger signal from the memory and data originating from the memory in response to the read signal;
      output a signal from the programmable delay element based on the read signal from the memory controller and the delay value received from the memory controller; and
      conditionally output a qualified trigger signal from the qualifying circuit based on the trigger signal received from the memory and assertion of the signal received from the programmable delay element; and
   wherein, said conditionally outputting the qualified trigger signal results in storing the data in the buffer.

2. The system of claim 1, wherein the interface is embedded on the same integrated circuit as the memory controller.

3. The system of claim 1, wherein the interface is further operable to generate a select signal by operating on the read signal.

4. The system of claim 3, wherein, in operating on the select signal, the interface is operable to delay the read signal by a predetermined latency.

5. The system of claim 4;
wherein the predetermined latency is a multiple of one-half of a system clock cycle; and
wherein the system clock is used by the memory controller, the memory, and the interface.

6. The system of claim 3;
wherein the interface is further operable to generate the signal from the programmable delay element by delaying the select signal using the programmable delay element; and
wherein a latency incurred in delaying the select signal is determined by the delay value.

7. The system of claim 1;
wherein the interface further includes a comparator block; and
wherein the comparator block is operable to compare the data originating from the memory, against expected data.

8. The system of claim 7;
wherein the comparator block is further operable to provide a delay feedback signal to the memory controller; and
wherein the delay feedback signal indicates whether the data originating from the memory matches the expected data.

9. The system of claim 7, wherein the expected data is provided to the interface by the memory controller.

10. The system of claim 8;
wherein the memory controller contains a delay manager unit;
wherein the delay manager unit is operable to receive a delay feedback signal; and
wherein the delay manager unit is further operable to generate the delay value.

11. The system of claim 10, wherein the delay manager unit is further operable to generate the delay value based on the value of the received delay feedback signal.

12. The system of claim 1, wherein the interface is further operable to generate an encoded version of the read signal.

13. The system of claim 12, wherein the memory is operable to receive one or more of:
the read signal from the memory controller; and
the encoded version of the read signal.

14. The system of claim 13, wherein the memory is further operable to generate one or more pulses of the trigger signal in response to one or more of:
the memory receiving a pulse of the read signal; and
the memory receiving a pulse of the encoded version of the read signal.

15. The system of claim 14, wherein the memory is further operable to send the data originating from the memory to the interface in response to one or more of:
the memory receiving a pulse of the read signal; and
the memory receiving a pulse of the encoded version of the read signal.

16. The system of claim 15, wherein the memory is a double data-rate synchronous dynamic random access memory (DDR SDRAM);
wherein the data originating from the memory is DDR SDRAM data; and
wherein the trigger signal is a DQS signal generated by the DDR SDRAM.

17. The system of claim 1, wherein said conditionally outputting the qualified trigger signal results in accurately storing the data in the buffer for a specified range of delay values.

18. The system of claim 17, wherein the specified range is empirically determined.

* * * * *